United States Patent
Greco et al.

(10) Patent No.: US 12,323,060 B2
(45) Date of Patent: Jun. 3, 2025

(54) BUCK-BOOST DC-DC CONVERTER CIRCUIT AND CORRESPONDING METHOD OF OPERATION

(71) Applicant: STMicroelectronics S.r.l., Agrate Brianza (IT)

(72) Inventors: Nunzio Greco, Camporotondo Etneo (IT); Osvaldo Enrico Zambetti, Milan (IT); Ranieri Guerra, S. Giovanni la Punta (IT); Francesca Giacoma Mignemi, S. Giovanni la Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 242 days.

(21) Appl. No.: 18/297,998

(22) Filed: Apr. 10, 2023

(65) Prior Publication Data

US 2023/0344350 A1  Oct. 26, 2023

(30) Foreign Application Priority Data

Apr. 22, 2022 (IT) .................. 102022000008108

(51) Int. Cl.
  *H02M 3/157* (2006.01)
  *H02M 1/00* (2006.01)
  *H02M 3/158* (2006.01)

(52) U.S. Cl.
  CPC ....... *H02M 3/1582* (2013.01); *H02M 1/0016* (2021.05); *H02M 3/157* (2013.01)

(58) Field of Classification Search
  CPC ... H02M 3/1582; H02M 1/0016; H02M 3/157
  See application file for complete search history.

(56) References Cited

U.S. PATENT DOCUMENTS

| | | | |
|---|---|---|---|
| 7,952,900 B2 * | 5/2011 | Tomiyoshi | H02M 3/1588 363/132 |
| 10,243,463 B2 | 3/2019 | Sun et al. | |
| 10,594,218 B1 * | 3/2020 | Zhan | G05F 1/62 |
| 10,637,357 B1 * | 4/2020 | Zhan | H02M 3/157 |
| 11,469,672 B2 * | 10/2022 | Chang | H02M 3/1584 |

(Continued)

OTHER PUBLICATIONS

Ren, X., et al., "Three-Mode Dual-Frequency Two-Edge Modulation Scheme for Four-Switch Buck-Boost Converter," IEEE Transactions on Power Electronics, vol. 24, No. 2, Feb. 2009, pp. 499-509.

(Continued)

*Primary Examiner* — Adolf D Berhane
(74) *Attorney, Agent, or Firm* — Slater Matsil, LLP

(57) ABSTRACT

A buck-boost converter circuit includes a mode selection circuit that asserts a buck enable signal if an input voltage is higher than a lower threshold, and asserts a boost enable signal if the input voltage is lower than an upper threshold. A control circuit asserts a buck PWM signal upon a pulse in a buck clock and de-asserts the buck PWM signal if a buck ramp is higher than a buck control signal, and it keeps the buck PWM signal asserted if the buck enable signal is de-asserted. The control circuit asserts a boost PWM signal upon a pulse in a boost clock and de-asserts the boost PWM signal if a boost ramp is higher than a boost control signal, and it keeps the boost PWM signal de-asserted if the boost enable signal is de-asserted.

20 Claims, 7 Drawing Sheets

(56) References Cited

U.S. PATENT DOCUMENTS

2009/0146623 A1    6/2009   de Cremoux et al.
2011/0187336 A1    8/2011   Wu et al.

OTHER PUBLICATIONS

Zhang, Neng et al, "Analysis of the non-inverting buck-boost converter with four-mode control method," IECON 2017, 43rd Annual Conference of the IEEE Industrial Electronics Society, Oct. 2017, pp. 876-881.

Huang, P. C., et al, "Hybrid buck-boost feedforward and reduced average inductor current techniques in fast line transient and high-efficiency buck-boost converter," IEEE Transactions on Power Electronics, vol. 25, No. 3, pp. 719-730, Mar. 3, 2010.

\* cited by examiner

BUCK-BOOST DC-DC CONVERTER CIRCUIT AND CORRESPONDING METHOD OF OPERATION

CROSS-REFERENCE TO RELATED APPLICATIONS

This application claims priority to Italian Patent Application No. 102022000008108, filed on Apr. 22, 2022, which application is hereby incorporated herein by reference.

TECHNICAL FIELD

The present disclosure relates to buck-boost DC-DC switching converters (e.g., non-inverting converters).

BACKGROUND

Voltage converters are conventionally used in power management systems to convert a DC input voltage $V_{in}$ into a DC output voltage $V_{out}$. Various topologies of switching mode power supply (SMPS) can be adopted to achieve high conversion efficiency. Buck converters provide a step-down conversion of the input voltage (i.e., $V_{out} < V_{in}$), and boost converters provide a step-up conversion (i.e., $V_{out} > V_{in}$). Non-inverting buck-boost converters are adopted when the output voltage $V_{out}$ can be higher or lower than the input voltage $V_{in}$, thus enabling both step-up and step-down voltage conversion.

SUMMARY

In one or more embodiments the present disclosure provides buck-boost DC-DC converters with improved efficiency and lower complexity.

One or more embodiments may relate to a corresponding method of operating a buck-boost DC-DC converter.

In one or more embodiments, a buck-boost DC-DC converter circuit includes a switching stage configured to receive a converter input voltage, a buck pulse-width modulated control signal and a boost pulse-width modulated control signal, and produce a converter output voltage as a function thereof. The converter includes an error amplifier circuit configured to sense the converter output voltage and a reference voltage, and produce an error signal indicative of a difference between the reference voltage and the converter output voltage. The converter includes an operation mode selection circuit configured to compare the converter input voltage to a lower threshold and an upper threshold.

The operation mode selection circuit is configured to assert a buck mode enable signal in response to the converter input voltage being higher than the lower threshold, and de-assert the buck mode enable signal in response to the converter input voltage being lower than the lower threshold. The operation mode selection circuit is configured to assert a boost mode enable signal in response to the converter input voltage being lower than the upper threshold, and de-assert the boost mode enable signal in response to the converter input voltage being higher than the upper threshold.

The converter includes a voltage shifter circuit configured to produce a buck control signal and a boost control signal as a function of the error signal, the buck mode enable signal, and the boost mode enable signal. The converter includes a ramp generator circuit configured to produce a buck ramp signal as a function of a buck clock signal and produce a boost ramp signal as a function of a boost clock signal. The converter includes a control circuit configured to compare the buck control signal to the buck ramp signal.

The control circuit is configured to assert the buck pulse-width modulated control signal in response to a pulse in the buck clock signal and de-assert the buck pulse-width modulated control signal in response to the buck ramp signal being higher than the buck control signal, provided that the buck mode enable signal is asserted. The control circuit is configured to keep the buck pulse-width modulated control signal asserted, provided that the buck mode enable signal is de-asserted. The control circuit is configured to compare the boost control signal to the boost ramp signal.

The control circuit is configured to assert the boost pulse-width modulated control signal in response to a pulse in the boost clock signal and de-assert the boost pulse-width modulated control signal in response to the boost ramp signal being higher than the boost control signal, provided that the boost mode enable signal is asserted. The control circuit is configured to keep the boost pulse-width modulated control signal de-asserted, provided that the boost mode enable signal is de-asserted. The voltage shifter circuit is configured to set $V_{C,buck} = V_{EA}$, where $V_{C,buck}$ is the value of the buck control signal and $V_{EA}$ is the value of the error signal, in response to the buck mode enable signal being asserted and the boost mode enable signal being de-asserted. The voltage shifter circuit is configured to set $V_{C,boost} = (V_{EA} - V_{FF})$, where $V_{C,boost}$ is the value of the boost control signal, $V_{EA}$ is the value of the error signal, and $V_{FF}$ is the value of a feedforward voltage of the buck-boost DC-DC converter circuit, in response to the buck mode enable signal being de-asserted and the boost mode enable signal being asserted. The voltage shifter circuit is configured to set $V_{C,buck} = (V_{EA} - k2 \cdot V_{ref1})$ and $V_{C,boost} = (V_{EA} - (k1+k2) \cdot V_{ref1})$, where $V_{C,buck}$ is the value of the buck control signal, $V_{EA}$ is the value of the error signal, $V_{ref1}$ is the value of the reference voltage, $V_{C,boost}$ is the value of the boost control signal, and k1 and k2 are values (e.g., constant values) that satisfy the conditions $k1 + 2 \cdot k2 = 1$ and $0 < k1 < 1$, in response to the buck mode enable signal being asserted and the boost mode enable signal being asserted.

One or more embodiments may thus provide a buck-boost DC-DC converter that automatically switches between buck, boost, and buck-boost operation modes with improved efficiency and low complexity.

In one or more embodiments, the voltage shifter circuit includes a voltage divider circuit including a first node, a second node, a third node, a fourth node, a first resistor coupled between the first node and the second node, a second resistor coupled between the second node and the third node, and a third resistor coupled between the third node and the fourth node. The first node is configured to produce the boost control signal, the second node is configured to produce the buck control signal, and the fourth node is configured to receive the error signal. The voltage shifter circuit includes a first current generator circuit configured to supply to the voltage divider circuit a current proportional to the feedforward voltage. The voltage shifter circuit includes a second current generator circuit configured to supply to the voltage divider circuit a current proportional to the reference voltage. The voltage shifter circuit includes a plurality of switches controllable by the buck mode enable signal and the boost mode enable signal. The plurality of switches are arranged to couple the voltage divider circuit to the first current generator circuit to receive the current proportional to the feedforward voltage in response to the buck mode enable signal being de-asserted; couple the voltage divider circuit to the second current generator circuit to receive the current proportional to the reference voltage in response to the buck mode enable signal being asserted; bypass the second resistor in response to the boost mode enable signal being de-asserted; and bypass the third resistor in response to the buck mode enable signal being asserted.

In one or more embodiments, the voltage shifter circuit includes a first voltage-to-current converter arrangement configured to sense the feedforward voltage and control the first current generator circuit, and a second voltage-to-current converter arrangement configured to sense the reference voltage and control the second current generator circuit.

In one or more embodiments, the ratio between the current produced by the first current generator circuit and the feedforward voltage is equal to 1/R, the ratio between the current produced by the second current generator circuit and the reference voltage is equal to 1/R, the first resistor has a resistance value equal to k1·R, the second resistor has a resistance value equal to k2·R, and the third resistor has a resistance value equal to (1−k1−k2)·R.

In one or more embodiments, the operation mode selection circuit comprises a voltage divider circuit configured to receive the converter input voltage and produce a first signal proportional to the converter input voltage and a second signal proportional to the converter input voltage. The proportionality factor of the first signal to the converter input voltage is higher than the proportionality factor of the second signal to the converter input voltage. The operation mode selection circuit comprises a first comparator configured to assert the buck mode enable signal in response to the first signal being higher than a further reference voltage, and de-assert the buck mode enable signal in response to the first signal being lower than the further reference voltage. The operation mode selection circuit comprises a second comparator configured to assert the boost mode enable signal in response to the further reference voltage being higher than the second signal, and de-assert the boost mode enable signal in response to the further reference voltage being lower than the second signal.

In one or more embodiments, the further reference voltage is linearly dependent on the reference voltage, or is proportional to the reference voltage, or is the same as the reference voltage.

In one or more embodiments, the control circuit includes a first comparator circuit configured to compare the buck control signal to the buck ramp signal, assert a buck comparison signal in response to the buck control signal being higher than the buck ramp signal, and de-assert the buck comparison signal in response to the buck control signal being lower than the buck ramp signal. The control circuit includes a second comparator circuit configured to compare the boost control signal to the boost ramp signal, assert a boost comparison signal in response to the boost control signal being higher than the boost ramp signal, and de-assert the boost comparison signal in response to the boost control signal being lower than the boost ramp signal. The control circuit includes a logic circuit configured to assert the buck pulse-width modulated control signal in response to the buck comparison signal being asserted and de-assert the buck pulse-width modulated control signal in response to the buck comparison signal being de-asserted, if the buck mode enable signal is asserted. The logic circuit is configured to assert the boost pulse-width modulated control signal in response to the boost comparison signal being asserted and de-assert the boost pulse-width modulated control signal in response to the boost comparison signal being de-asserted, if the boost mode enable signal is asserted.

According to another aspect of the present disclosure, a method of operating a buck-boost DC-DC converter circuit comprises:
  receiving a converter input voltage, a buck pulse-width modulated control signal and a boost pulse-width modulated control signal, and producing a converter output voltage as a function thereof;
  sensing the converter output voltage and a reference voltage, and producing an error signal indicative of a difference between the reference voltage and the converter output voltage;
  comparing the converter input voltage to a lower threshold and an upper threshold;
  asserting a buck mode enable signal in response to the converter input voltage being higher than the lower threshold, and de-asserting the buck mode enable signal in response to the converter input voltage being lower than the lower threshold;
  asserting a boost mode enable signal in response to the converter input voltage being lower than the upper threshold, and de-asserting the boost mode enable signal in response to the converter input voltage being higher than the upper threshold;
  producing a buck control signal and a boost control signal as a function of the error signal, the buck mode enable signal and the boost mode enable signal;
  producing a buck ramp signal as a function of a buck clock signal and a boost ramp signal as a function of a boost clock signal;
  comparing the buck control signal to the buck ramp signal;
  if the buck mode enable signal is asserted, asserting the buck pulse-width modulated control signal in response to a pulse in the buck clock signal and de-asserting the buck pulse-width modulated control signal in response to the buck ramp signal being higher than the buck control signal;
  if the buck mode enable signal is de-asserted, keeping the buck pulse-width modulated control signal asserted;
  comparing the boost control signal to the boost ramp signal;
  if the boost mode enable signal is asserted, asserting the boost pulse-width modulated control signal in response to a pulse in the boost clock signal and de-asserting the boost pulse-width modulated control signal in response to the boost ramp signal being higher than the boost control signal;
  if the boost mode enable signal is de-asserted, keeping the boost pulse-width modulated control signal de-asserted;
  setting $V_{C,buck}=V_{EA}$, where $V_{C,buck}$ is the value of the buck control signal and $V_{EA}$ is the value of the error signal, in response to the buck mode enable signal being asserted and the boost mode enable signal being de-asserted;
  setting $V_{C,boost}=(V_{EA}-V_{FF})$, where $V_{C,boost}$ is the value of the boost control signal, $V_{EA}$ is the value of the error signal, and $V_{FF}$ is the value of a feedforward voltage of the buck-boost DC-DC converter circuit, in response to the buck mode enable signal being de-asserted and the boost mode enable signal being asserted; and
  setting $V_{C,buck}=(V_{EA}-k2 \cdot V_{ref1})$ and $V_{C,boost}=(V_{EA}-(k1+k2) \cdot V_{ref1})$, where $V_{C,buck}$ is the value of the buck control signal, $V_{EA}$ is the value of the error signal, $V_{ref1}$ is the value of the reference voltage, $V_{C,boost}$ is the value of the boost control signal, and k1 and k2 are constant values that satisfy the conditions k1+2·k2=1 and 0<k1<1, in response to the buck mode enable signal being asserted and the boost mode enable signal being asserted.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

In the ensuing description, one or more specific details are illustrated, aimed at providing an in-depth understanding of examples of embodiments of this disclosure. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present disclosure is intended to indicate that a particular configuration, structure, or characteristic described in relation to the embodiment is included in at least one embodiment. Hence, phrases such as "in an embodiment" or "in one embodiment" that may be present in one or more points of the present disclosure do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding disclosure will not be repeated for the sake of brevity.

Figure 1:
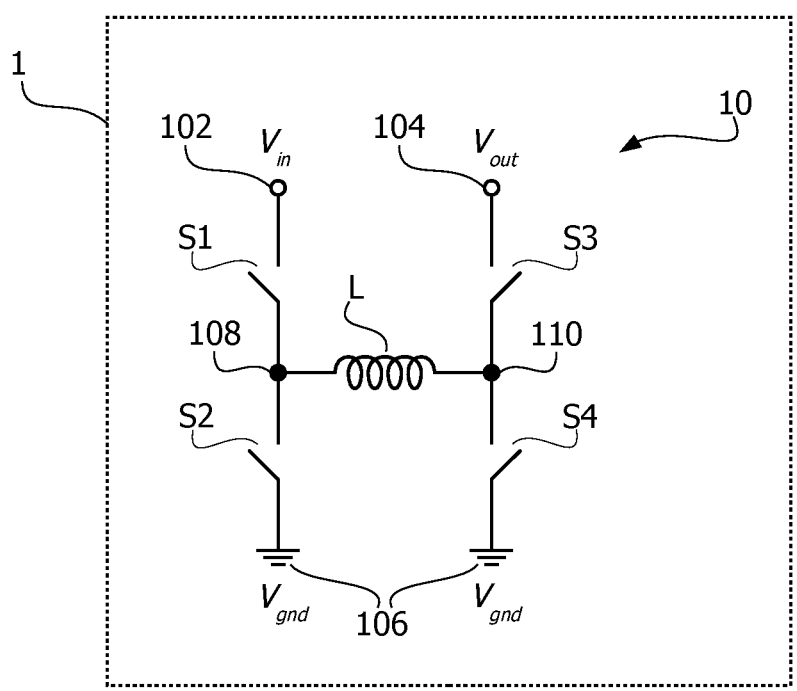
FIG. 1 is a circuit diagram exemplary of a four-switch switching stage of a buck-boost converter.

FIG. 1 is a circuit diagram exemplary of the switching stage 10 of a buck-boost converter 1, particularly a four-switch non-inverting buck-boost converter. The switching stage 10 comprises an input node 102 configured to receive an input voltage $V_{in}$, an output node 104 configured to produce an output voltage $V_{out}$, and a reference voltage node 106 (or ground node) configured to provide a reference voltage (or ground voltage) $V_{gnd}$ (e.g., 0 V). A first half-bridge circuit (buck half-bridge circuit) is arranged between the input node 102 and the ground node 106, and includes a first high-side switch S1 arranged between the input node 102 and a first intermediate node (or switching node) 108, and a first low-side switch S2 arranged between the first switching node 108 and the ground node 106. A second half-bridge circuit (boost half-bridge circuit) is arranged between the output node 104 and the ground node 106, and includes a second high-side switch S3 arranged between the output node 104 and a second intermediate node (or switching node) 110, and a second low-side switch S4 arranged between the second switching node 110 and the ground node 106. A coil L (e.g., an inductor, possibly external to the integrated circuit that incorporates the converter 1) is arranged between the switching nodes 108 and 110.

Figure 2:
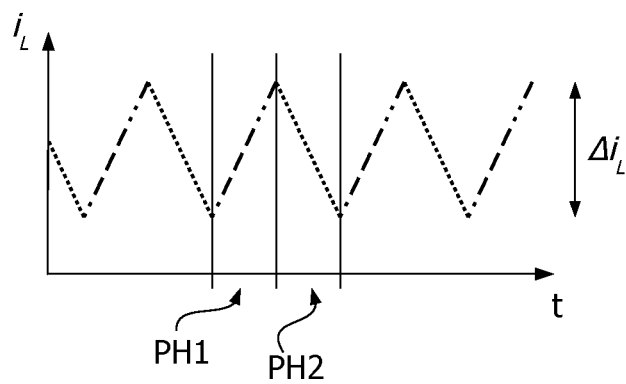
FIG. 2 is a time diagram exemplary of the coil current flowing through a coil coupled to the switching stage of FIG. 1 when the converter operates in a two-phase control mode.

FIG. 2 is a time diagram exemplary of the time evolution of the coil current $i_L$ flowing through the coil L coupled to converter 1 when the converter operates in a two-phase control mode, i.e., when each switching cycle comprises two phases. In a first phase PH1, switches S1 and S4 are closed and switches S2 and S3 are open, so that the coil L is energized (e.g., magnetized, charged) by being coupled between the input node 102 at voltage $V_{in}$ and the ground node 106 at voltage $V_{gnd}$, with current $i_L$ flowing from node 102 to node 106 as exemplified by the dash-and-dot line in FIG. 2. In a second phase PH2, switches S2 and S3 are closed and switches S1 and S4 are open, so that the coil L is de-energized (e.g., demagnetized, discharged) by being coupled between the ground node 106 at voltage $V_{gnd}$ and the output node 104 at voltage limit, with current $i_L$ flowing from node 106 to node 104 as exemplified by the dotted line in FIG. 2. The two-phase operation mode can be used for every combination of input and output voltages, since it does not depend on the difference between the input voltage $V_{in}$ and the output voltage $V_{out}$. However, the two-phase operation mode may result in a high coil current ripple $\Delta i_L$ and a high root mean square (rms) value of the coil current $i_L$, which lead to poor efficiency and low usability of this control scheme. For instance, with $V_{in}=V_{out}=12$ V, an inductance of the coil L equal to 2 µH and a switching frequency $f_{SW}$ of about 1 MHz, the coil current ripple $\Delta i_L$ may be about 3 A.

Some solutions aiming at reducing the coil current ripple $\Delta i_L$ may rely on increasing the inductance value of the coil L or increasing the switching frequency of the converter 1, which however may result in a large area occupation on the printed circuit board (PCB), a high cost and/or a low efficiency.

Figure 3:
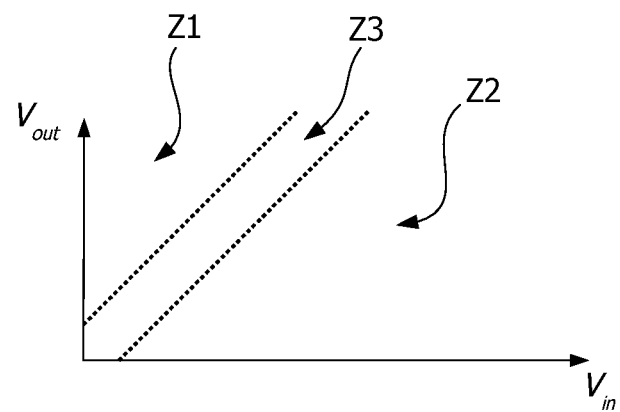
FIG. 3 is a diagram exemplary of possible operating areas of a buck-boost converter.

To overcome these drawbacks, a buck-boost converter can be forced to operate in pure buck mode by stopping the switching activity of the boost half-bridge circuit S3, S4 when $V_{in} > V_{out}$, or in pure boost mode by stopping the switching activity of the buck half-bridge circuit S1, S2 when $V_{in} < V_{out}$. To this regard, FIG. 3 is a diagram exemplary of possible operating areas of a buck-boost converter, which depend on the values of the input voltage $V_{in}$ and of the output voltage $V_{out}$. In particular, the buck-boost converter may operate in pure boost mode (i.e., with switch S1 steadily closed and switch S2 steadily open) when in the operating area Z1, and in pure buck mode (i.e., with switch S3 steadily closed and switch S4 steadily open) when in the operating area Z2. However, when operating in the operating area Z3 where $V_{in} \approx V_{out}$, a so-called "dead zone" has to be taken into consideration, whose limits depend on the minimum turn-off time $T_{off}$ and turn-on time $T_{on}$ that can be managed by the gate drivers that drive the first and second half-bridge circuits (i.e., that drive switching of switches S1, S2, S3, S4).

Figure 4:
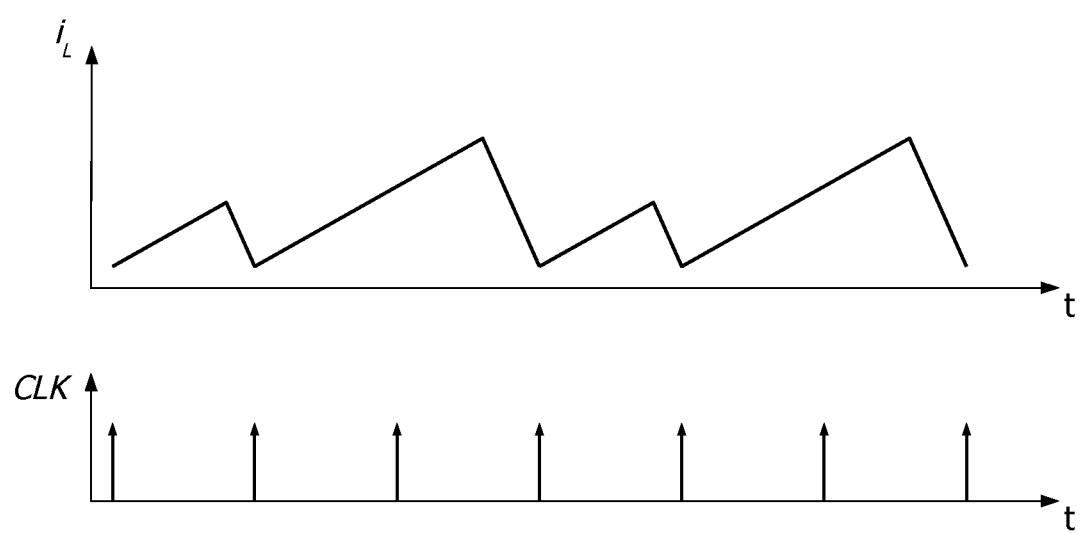
FIG. 4 is a time diagram exemplary of possible time evolution of the coil current and of the converter clock signal for a buck-boost converter that operates in pure buck mode inside the dead zone.

In conventional fixed-frequency systems, the turn-on and turn-off timings suitable for operating in the dead zone Z3 cannot be provided by the gate drivers, resulting in some switching pulses possibly being skipped (e.g., missed) and the coil current ripple $\Delta i_L$ increasing again as exemplified in the time diagrams of FIG. 4, which illustrate a possible time evolution of the coil current $i_L$ and of the converter clock signal CLK for a buck-boost converter that operates in pure buck mode inside the dead zone Z3 of FIG. 3. This unwanted behavior (i.e., unexpected pulse skipping) may in turn cause system meta-stability and oscillations of the converter.

Some solutions to control a buck-boost converter in the dead zone Z3 may resort to a three-phase control scheme. In the third phase that follows the second phase, the coil L is coupled between the input node 102 and the output node 104 (i.e., switches S1 and S3 are closed, and switches S2 and S4 are open), with the coil current $i_L$ being almost flat during such a third phase.

Figure 5:
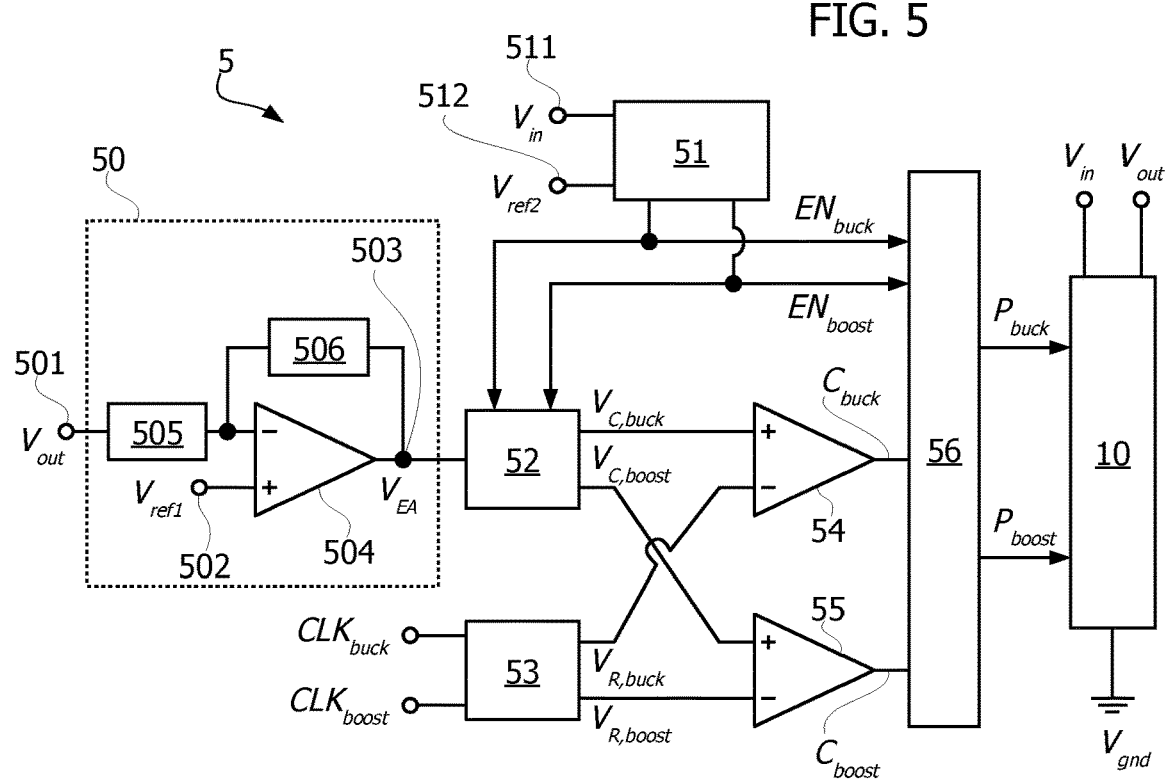
FIG. 5 is a circuit block diagram exemplary of a buck-boost converter according to one or more embodiments of the present disclosure.

FIG. 5 is a circuit block diagram exemplary of a fixed-frequency, dual-ramp buck-boost non-inverting converter 5 according to one or more embodiments of the present disclosure. In particular, FIG. 5 is exemplary of the control architecture of converter 5.

Converter 5 comprises an error amplifier circuit 50 (e.g., a differential amplifier) configured to compare the converter output voltage $V_{out}$ to a reference voltage $V_{ref1}$ and produce an error signal $V_{EA}$ indicative of the difference between $V_{ref1}$ and $V_{out}$. For instance, the error amplifier circuit 50 may comprise a first input node 501 configured to receive the converter output voltage $V_{out}$, a second input node 502 configured to receive the reference voltage $V_{ref1}$, and an output node 503 configured to produce the error signal $V_{EA}$. The error amplifier circuit 50 may comprise an operational amplifier circuit 504 having a first (e.g., non-inverting) input coupled to node 502 to receive voltage $V_{ref1}$ and a second (e.g., inverting) input coupled to node 501 via a feedback circuitry block 505 to receive voltage $V_{out}$. The error amplifier circuit 50 may comprise another feedback circuitry block 506 coupled between the second input and the output node 503 to close the feedback loop of the amplifier circuit 50.

Figure 6:
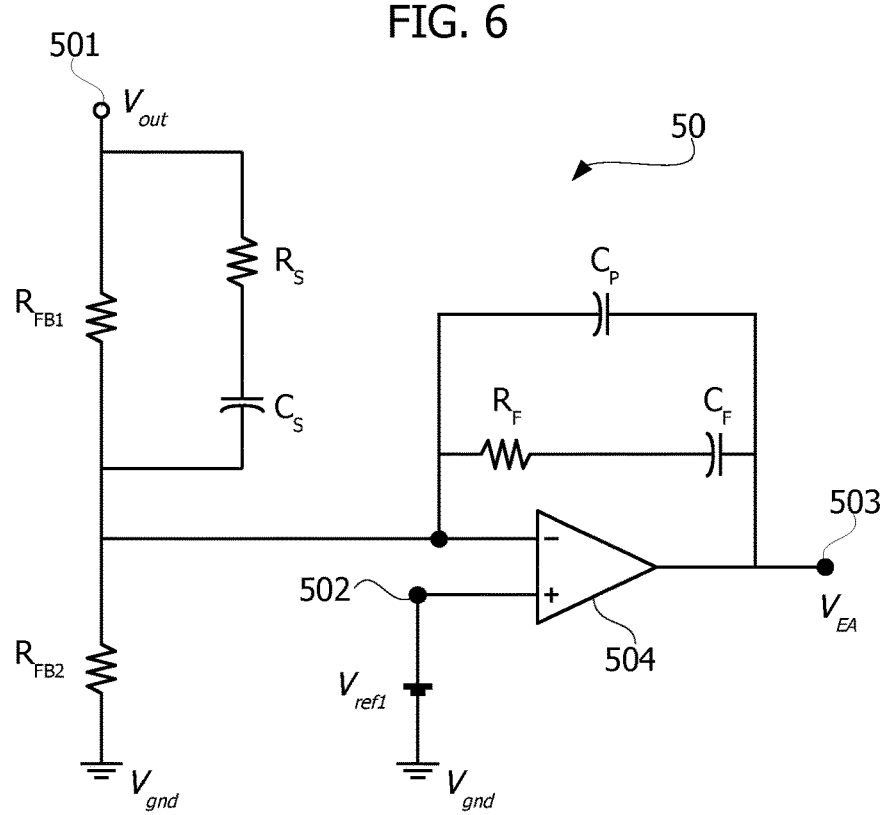
FIG. 6 is a circuit block diagram exemplary of possible implementation details of an error amplifier circuit of a buck-boost converter according to one or more embodiments of the present disclosure.

For instance, as exemplified in FIG. 6, the feedback circuitry block 505 may comprise a feedback voltage divider arranged between node 501 and the ground node (e.g., 106). The feedback voltage divider may comprise a first resistor $R_{FB1}$ arranged between node 501 and the inverting input of amplifier 504, and a second resistor $R_{FB2}$ arranged between the inverting input of amplifier 504 and the ground node. Resistor $R_{FB2}$ may have a resistance value lower than the resistance value of resistor $R_{FB1}$ (e.g., $R_{FB2} = R_{FB1}/9$) Additionally, the feedback circuitry block 505 may comprise a resistor $R_S$ and a capacitor $C_S$ arranged in series between node 501 and the inverting input of amplifier 504 (i.e., in parallel to resistor $R_{FB1}$). The feedback circuitry block 506 may comprise a capacitor $C_P$ arranged between the inverting input of amplifier 504 and the output node 503 of amplifier 504. The feedback circuitry block 506 may further comprise a resistor $R_F$ and a capacitor $C_F$ arranged in series between the inverting input of amplifier 504 and the output node 503 of amplifier 504 (i.e., in parallel to capacitor $C_P$). The feedback loop of converter 5 operates so that, in steady state conditions, the voltage at the inverting input of amplifier 504, i.e., a scaled replica of the output voltage $V_{out}$ (e.g., $V_{out}/10$ in case $R_{FB2} = R_{FB1}/9$) is equal to the reference voltage $V_{ref1}$.

Again with reference to FIG. 5, converter 5 comprises a mode selection circuit 51 configured to produce a buck mode enable signal $EN_{buck}$ and a boost mode enable signal $EN_{boost}$ as a function of the value of the converter input voltage Vin and (indirectly) of the value of converter output voltage $V_{out}$. For instance, the mode selection circuit 51 may comprise a first input node 511 configured to receive the converter input voltage $V_{in}$, and a second input node 512 configured to receive a reference voltage $V_{ref2}$. Reference voltage $V_{ref2}$ may be equal to reference voltage $V_{ref1}$, or proportional to reference voltage $V_{ref1}$, or linearly dependent to reference voltage $V_{ref1}$, which in turn is related to the output voltage $V_{out}$. Alternatively, reference voltage $V_{ref2}$ may be set independently from reference voltage $V_{ref1}$, using proper trimming depending on the application.

The mode selection circuit 51 may be configured to assert (e.g., set to a high value, logic 1) the buck mode enable signal $EN_{buck}$ in response to the input voltage $V_{in}$ being higher than a first threshold $V_{th,buck}$, and de-assert (e.g., set to a low value, logic 0) the buck mode enable signal $EN_{buck}$ in response to the input voltage $V_{in}$ being lower than the first threshold $V_{th,buck}$. The mode selection circuit 51 may be configured to assert (e.g., set to a high value, logic 1) the boost mode enable signal $EN_{boost}$ in response to the input voltage $V_{in}$ being lower than a second threshold $V_{th,boost}$, and de-assert (e.g., set to a low value, logic 0) the boost mode enable signal $EN_{boost}$ in response to the input voltage $V_{in}$ being higher than the second threshold $V_{th,boost}$. The second threshold $V_{th,boost}$ may be higher than the first threshold $V_{th,buck}$. The buck mode enable signal $EN_{buck}$ and the boost mode enable signal $EN_{boost}$ are used to control the operating mode of converter 5 (e.g., pure buck, pure boost or buck-boost) as further disclosed in the following.

Converter 5 comprises a voltage shifter circuit 52 (e.g., an analog voltage shifter) configured to produce a buck control signal $V_{C,buck}$ and a boost control signal $V_{C,boost}$ as a function of the value of the error signal $V_{EA}$, and depending on the current operating mode of the converter 5 (e.g., pure buck, pure boost or buck-boost) determined by the values of signals $EN_{buck}$ and $EN_{boost}$. Further details of voltage shifter circuit 52 are disclosed in the following.

Converter 5 comprises a dual ramp generator circuit 53 configured to produce a buck ramp signal $V_{R,buck}$ and a boost ramp signal $V_{R,boost}$ as a function of a buck clock signal $CLK_{buck}$ and a boost clock signal $CLK_{boost}$, respectively. For instance, the ramp signals $V_{R,buck}$ and $V_{R,boost}$ may have a triangular or saw-tooth waveform produced according to the conventional operation of switching converters. The ramp signals $V_{R,buck}$ and $V_{R,boost}$ may be time-shifted with respect to one another. The ramp signals $V_{R,buck}$ and $V_{R,boost}$ may be used to control the buck half-bridge and the boost half-bridge of the switching stage 10 separately.

Converter 5 comprises a first comparator circuit 54 having a first (e.g., non-inverting) input configured to receive the buck control signal $V_{C,buck}$ and a second (e.g., inverting) input configured to receive the buck ramp signal $V_{R,buck}$ to produce a buck comparison signal $C_{buck}$. Therefore, the buck comparison signal $C_{buck}$ may be asserted (e.g., set to a high logic value, logic 1) when $V_{C,buck} > V_{R,buck}$ and de-asserted (e.g., set to a low logic value, logic 0) when $V_{C,buck} < V_{R,buck}$.

Converter 5 comprises a second comparator circuit 55 having a first (e.g., non-inverting) input configured to receive the boost control signal $V_{C,boost}$ and a second (e.g., inverting) input configured to receive the boost ramp signal $V_{R,boost}$ to produce a boost comparison signal $C_{boost}$. Therefore, the boost comparison signal $C_{boost}$ may be asserted (e.g., set to a high logic value, logic 1) when $V_{C,boost} > V_{R,boost}$ and de-asserted (e.g., set to a low logic value, logic 0) when $V_{C,boost} < V_{R,boost}$.

Converter 5 comprises a logic and driver circuit 56 (e.g., a control circuit) configured to receive signals $EN_{buck}$, $EN_{boost}$, $C_{buck}$, $C_{boost}$, $CLK_{buck}$ and $CLK_{boost}$ and produce, as a function thereof, a pulse-width modulated (PWM) buck signal $P_{buck}$ and a pulse-width modulated (PWM) boost signal $P_{boost}$ for controlling the commutation of switches S1, S2, S3 and S4, thereby determining the commutation duty-cycle $D_{buck}$ of the buck half-bridge circuit (i.e., switches S1 and S2) and the commutation duty-cycle $D_{boost}$ of the boost half-bridge circuit (i.e., switches S3 and S4). It is assumed herein that when the PWM buck signal $P_{buck}$ is asserted, switch S1 is closed (e.g., on, conductive) and switch S2 is open (e.g., off, non-conductive), while when the PWM buck signal $P_{buck}$ is de-asserted, switch S1 is open and switch S2 is closed. Similarly, when the PWM boost signal $P_{boost}$ is asserted, switch S3 is open and switch S4 is closed, while when the PWM boost signal $P_{boost}$ is de-asserted, switch S3 is closed and switch S4 is open.

In particular, the PWM signals $P_{buck}$ and $P_{boost}$ may be produced by circuit 56 according to the following logic.

Provided that the enable signal $EN_{buck}$ is asserted, signal $P_{buck}$ may be asserted (e.g., a rising edge may be generated therein) in response to a pulse in the clock signal $CLK_{buck}$, and may be de-asserted (e.g., a falling edge may be generated therein) in response to the ramp signal $V_{R,buck}$ exceeding the control signal $V_{C,buck}$ (i.e., in response to the comparison signal $C_{buck}$ being de-asserted). Otherwise, if the enable signal $EN_{buck}$ is de-asserted, signal $P_{buck}$ may be kept asserted independently from the value of the comparison signal $C_{buck}$.

Provided that the enable signal $EN_{boost}$ is asserted, signal $P_{boost}$ may be asserted (e.g., a rising edge may be generated therein) in response to a pulse in the clock signal $CLK_{boost}$, and may be de-asserted (e.g., a falling edge may be generated therein) in response to the ramp signal $V_{R,boost}$ exceeding the control signal $V_{C,boost}$ (i.e., in response to the comparison signal $C_{boost}$ being de-asserted). Otherwise, if the enable signal $EN_{boost}$ is de-asserted, signal $P_{boost}$ may be kept de-asserted independently from the value of the comparison signal $C_{boost}$.

Operation of converter 5 as described with reference to FIG. 5 may be further understood by referring to FIG. 7, which illustrates time diagrams exemplary of signals $V_{in}$, $V_{out}$, $V_{th,buck}$, $V_{th,boost}$, $EN_{buck}$, $EN_{boost}$, $CLK_{buck}$, $CLK_{boost}$, $V_{R,buck}$, $V_{R,boost}$, $V_{C,buck}$, $V_{C,boost}$, $C_{buck}$, $C_{boost}$, $P_{buck}$ and $P_{boost}$ in the converter 5 when passing from boost mode operation, to buck-boost mode operation, to buck mode operation.

Figure 7:
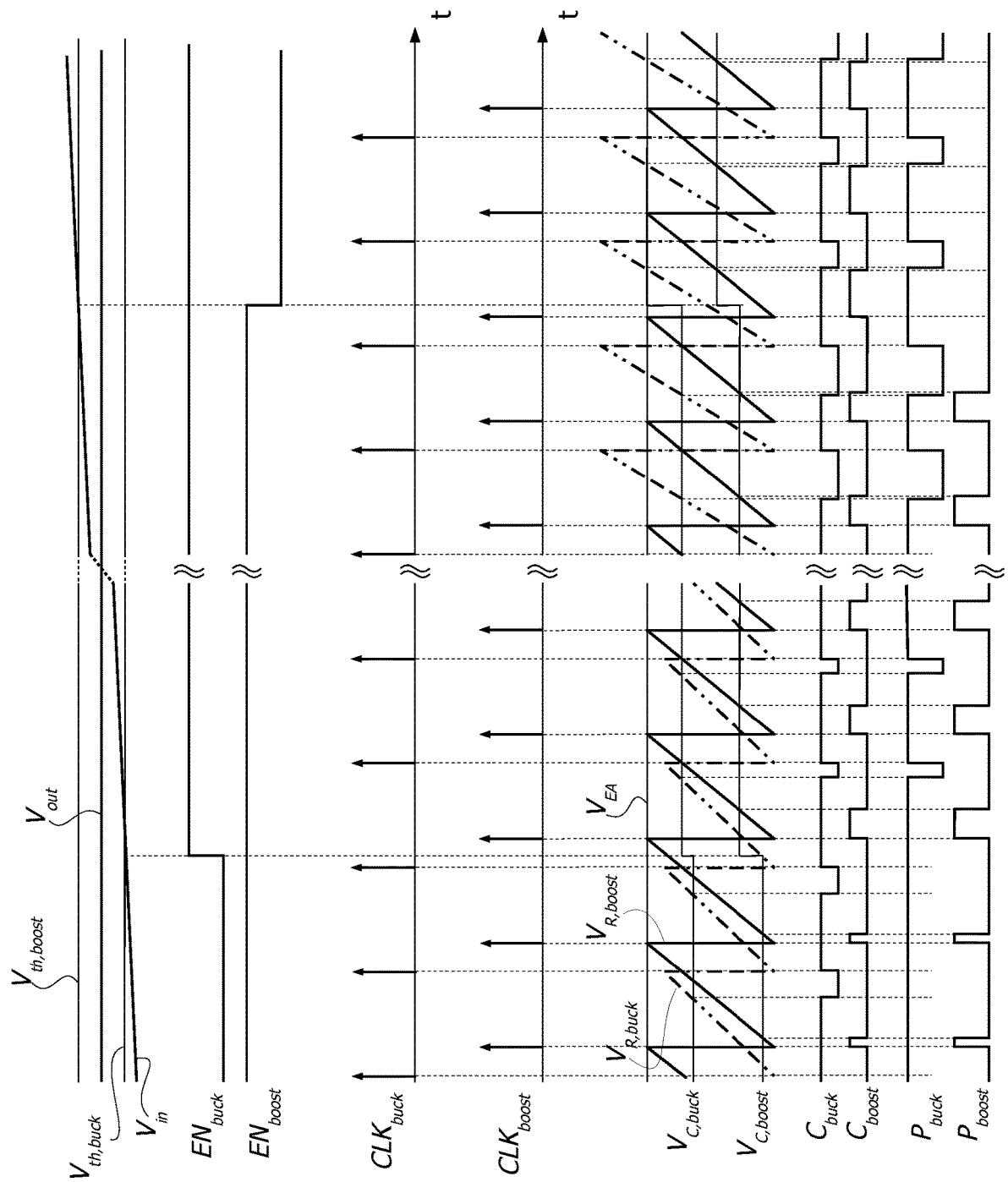
FIG. 7 is a schematic time diagram exemplary of the possible time evolution of signals in a buck-boost converter according to one or more embodiments of the present disclosure.

As exemplified in FIG. 7, when the input voltage $V_{in}$ is lower than the mode detector threshold $V_{th,buck}$, the buck enable signal $EN_{buck}$ is de-asserted (e.g., low) and the boost enable signal $EN_{boost}$ is asserted (e.g., high). The converter 5 operates in boost mode: signal $P_{buck}$ is kept asserted—that is, switch S1 is kept conductive (on) and switch S2 is kept non-conductive (off)—while the pulses of clock signal $CLK_{boost}$ and the value of comparison signal $C_{boost}$ define the shape and duty-cycle of the boost PWM signal $P_{boost}$ that controls switches S3 and S4.

As exemplified in FIG. 7, when the input voltage $V_{in}$ is higher than the mode detector threshold $V_{th,boost}$, the buck enable signal $EN_{buck}$ is asserted (e.g., high) and the boost enable signal $EN_{boost}$ is de-asserted (e.g., low). The converter 5 operates in buck mode: signal $P_{boost}$ is kept de-asserted—that is, switch S3 is kept conductive (on) and switch S4 is kept non-conductive (off)—while the pulses of clock signal $CLK_{buck}$ and the value of comparison signal $C_{buck}$ define the shape and duty-cycle of the buck PWM signal $P_{buck}$ that controls switches S1 and S2.

Still as exemplified in FIG. 7, when the input voltage $V_{in}$ is between the mode detector thresholds $V_{th,buck}$ and $V_{th,boost}$, both signals $EN_{buck}$ and $EN_{boost}$ are asserted (e.g., high) and the converter 5 operates in buck-boost mode. Both the buck half-bridge circuit and the boost half-bridge circuit switch with different duty-cycles under control of PWM signals $P_{buck}$ and $P_{boost}$, respectively. In buck-boost mode, the shape and duty-cycle of signal $P_{buck}$ depend on the pulses of clock signal $CLK_{buck}$ and on the value of comparison signal $C_{buck}$, while the shape and duty-cycle of signal $P_{boost}$ depend on the pulses of clock signal $CLK_{boost}$ and on the value of comparison signal $C_{boost}$.

Figure 8:
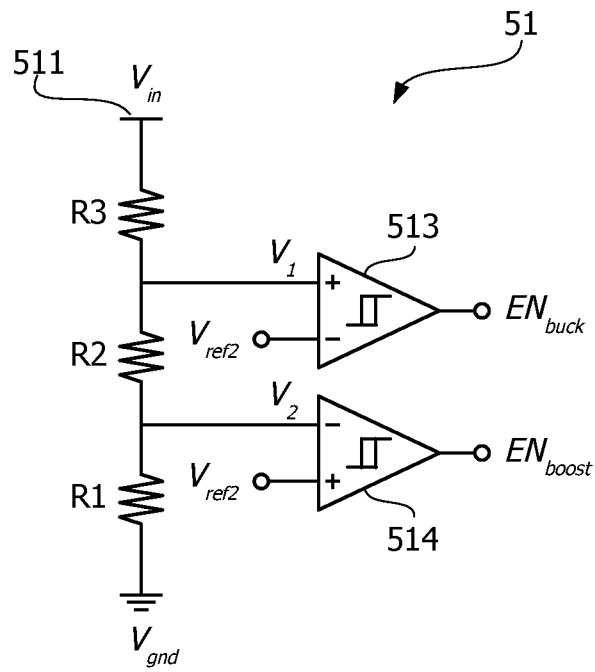
FIG. 8 is a circuit block diagram exemplary of possible implementation details of an operating mode selection circuit of a buck-boost converter according to one or more embodiments of the present disclosure.
Figure 9:
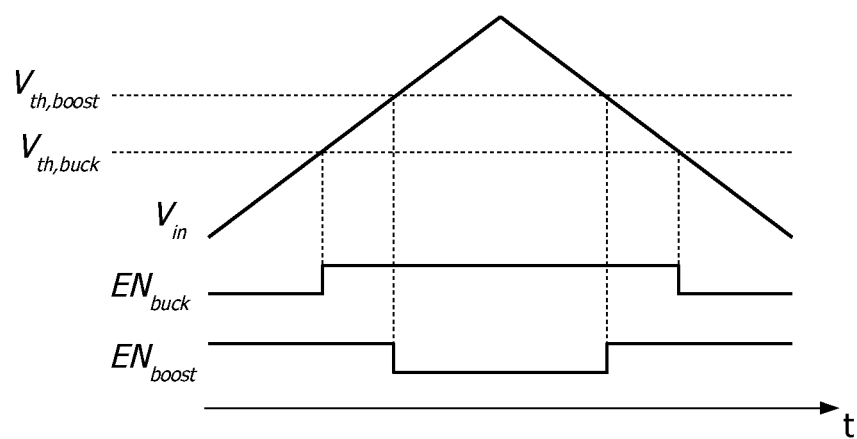
FIG. 9 is a time diagram exemplary of the possible time evolution of signals in an operating mode selection circuit as exemplified in FIG. 8.

FIG. 8 is a circuit diagram exemplary of possible implementation details of a mode selection circuit 51 according to one or more embodiments. FIG. 9 is a time diagram exemplary of signals $EN_{buck}$ and $EN_{boost}$ as a function of voltage $V_{in}$, and is exemplary of operation of the mode selection circuit 51. Mode selection circuit 51 may comprise a voltage divider circuit for producing two signals $V_1$ and $V_2$ proportional to the input voltage $V_{in}$. For instance, a resistive voltage divider may comprise a first resistor R1, a second resistor R2 and a third resistor R3 arranged in series between the reference voltage node 106 (at voltage $V_{gnd}$, e.g., 0 V) and the input node 511 (at voltage $V_{in}$). A first comparator circuit 513 (e.g., a comparator with hysteresis) may have a first (e.g., non-inverting) input coupled to a node intermediate resistors R3 and R2 to receive signal $V_1$, and a second (e.g., inverting) input coupled to node 512 to receive the reference voltage $V_{ref2}$. Signal $EN_{buck}$ may be produced at the output of comparator 513. Therefore, signal $EN_{buck}$ may be asserted if $V_{ref2} < V_1$ where $V_1 = V_{in} \cdot (R1+R2)/(R1+R2+R3)$ or, in other terms, if $V_{in} > V_{th,buck}$ where $V_{th,buck} = V_{ref2} \cdot (R1+R2+R3)/(R1+R2)$. A second comparator circuit 514 (e.g., a comparator with hysteresis) may have a first (e.g., inverting) input coupled to a node intermediate resistors R2 and R1 to receive signal $V_2$, and a second (e.g., non-inverting) input coupled to node 512 to receive the reference voltage $V_{ref2}$. Signal $EN_{boost}$ may be produced at the output of comparator 514. Therefore, signal $EN_{boost}$ may be asserted if $V_{ref2} > V_2$ where $V_2 = V_{in} \cdot R1/(R1+R2+R3)$ or, in other terms, if $V_{in} < V_{th,boost}$ where $V_{th,boost} = V_{ref2} \cdot (R1+R2+R3)/R1$. From the equations above, it is also noted that $V_{th,boost} > V_{th,buck}$.

Therefore, the following operating regions can be identified, depending on the value of voltage $V_{in}$, as exemplified in FIG. 9. If $V_{in}<V_{th,buck}$, then $EN_{buck}=0$ and $EN_{boost}=1$, and converter 5 operates in boost mode. If $V_{th,buck}<V_{in}<V_{th,boost}$, then $EN_{buck}=1$ and $EN_{boost}=1$, and converter 5 operates in buck-boost mode. If $V_{in}>V_{th,boost}$, then $EN_{buck}=1$ and $EN_{boost}=0$, and converter 5 operates in buck mode. The values of the thresholds, $V_{th,buck}$ and $V_{th,boost}$, define the limits of the buck-boost operating region and control the minimum $T_{on}$ (respectively, $T_{off}$) that the converter can reach in boost (respectively, buck) operation mode. The size of the buck-boost operating region may be defined as a trade-off between the converter efficiency and the minimum $T_{on}/T_{off}$ achievable by the gate drivers.

Providing smooth transitions between the three operating regions of converter 5 along with input voltage feed-forward is a desirable feature. Therefore, in one or more embodiments the analog voltage shifter circuit 52 may be configured to implement three different relationships between the control signals $V_{C,buck}$ and $V_{C,boost}$ and the error signal $V_{EA}$, so as to keep the error signal $V_{EA}$ ideally constant throughout the ranges of $V_{in}$ and $V_{out}$, as disclosed in the following.

Considering the step-down buck portion of converter 5, the input/output voltage relationship $V_{out}=D_{buck} \cdot V_{in}$ leads to the following steady state value for $D_{buck}$ (equation 1):

$$D_{buck}=V_{out}/V_{in} \quad (1)$$

In a fixed-frequency architecture as considered herein, the value of the duty-cycle $D_{buck}$ follows from the comparison of the buck control signal $V_{C,buck}$ with the buck ramp signal $V_{R,buck}$, which shapes the buck PWM signal $P_{buck}$. If the height of the ramp signal $V_{R,buck}$ (i.e., the difference between the ramp maximum value and the ramp minimum value, which is also equal to the ramp slew rate multiplied the clock period) is equal to the feed-forward voltage $V_{FF}=V_{in}/\alpha$ (where $\alpha=V_{out}/V_{ref1}$; consequently, $V_{FF}=V_{ref1} \cdot V_{in}/V_{out}$) and the control voltage $V_{C,buck}$ is equal to the error signal $V_{EA}$, then the duty-cycle $D_{buck}$ can be computed according to equation 2 below:

$$D_{buck}=V_{EA}/V_{FF} \quad (2)$$

Combining equations 1 and 2 above, the steady state value of the error signal $V_{EA}$ can be written as $V_{EA}=V_{out}/\alpha$ and does not depend on the value of the converter input voltage $V_{in}$.

Considering now the step-up boost portion of converter 5, the input/output voltage relationship $V_{out}=V_{in}/(1-D_{boost})$ leads to the following steady state value for $D_{boost}$: $D_{boost}=1-V_{in}/V_{out}$. In a fixed-frequency architecture as considered herein, the value of the duty-cycle $D_{boost}$ follows from the comparison of the boost control signal $V_{C,boost}$ with the boost ramp signal $V_{R,boost}$, which shapes the boost PWM signal $P_{boost}$. If the height of the ramp signal $V_{R,boost}$ is equal to the reference voltage $V_{ref1}=V_{out}/\alpha$ and the control voltage $V_{C,boost}$ is equal to the difference between the error signal $V_{EA}$ and the feed-forward voltage $V_{FF}$ ($V_{C,boost}=V_{EA}-V_{FF}$), then the duty-cycle $D_{boost}$ can be computed as: $D_{boost}=(V_{EA}-V_{FF})/V_{ref1}$. The steady state value of the error signal $V_{EA}$ can thus be written as $V_{EA}=V_{out}/\alpha$, which is the same obtained previously for the step-down buck converter, and does not depend on the value of the converter input voltage $V_{in}$.

In one or more embodiments, the analog voltage shifter circuit 52 may thus be configured to produce control voltages $V_{C,buck}$ and $V_{C,boost}$ so that, when converter 5 operates in the buck-boost mode, the error signal $V_{EA}$ maintains a value $V_{EA}=V_{out}/\alpha$, which facilitates smooth transitions between the converter operating modes.

Considering the buck-boost operation of converter 5, the input/output voltage relationship can be written according to equation 3 below:

$$V_{out}=(D_{buck}/(1-D_{boost}))V_{in} \quad (3)$$

If the height of the buck ramp signal $V_{R,buck}$ is equal to the feed-forward voltage $V_{FF}=V_{in}/\alpha$ (as considered before) and the buck control voltage $V_{C,buck}$ is shifted with respect to the error signal $V_{EA}$ by a quantity $k2 \cdot V_{ref1}$ (i.e., $V_{C,buck}=V_{EA}-k2 \cdot V_{ref1}$ with k2 being a constant), then the duty-cycle $D_{buck}$ can be computed according to equation 4 below:

$$D_{buck}=(V_{EA}-k2 \cdot V_{ref1})/V_{FF} \quad (4)$$

Similarly, if the height of the boost ramp signal $V_{R,boost}$ is equal to reference voltage $V_{ref1}$ (as considered before) and the boost control voltage $V_{C,boost}$ is shifted with respect to the error signal $V_{EA}$ by a quantity $(k1+k2) \cdot V_{ref1}$ (i.e., $V_{C,boost}=V_{EA}-(k1+k2) \cdot V_{ref1}$ or, in other terms, $V_{C,buck}-V_{C,boost}=k1 \cdot V_{ref1}$, with k1 being a constant), then the duty-cycle $D_{boost}$ can be computed according to equation 5 below:

$$D_{boost}=(V_{EA}-(k1+k2) \cdot V_{ref1})/V_{ref1} \quad (5)$$

Combining equations 4 and 5 into equation 3 above, the steady state value of the error signal $V_{EA}$ can be written according to equation 6 below:

$$V_{EA}=V_{ref1} \cdot (1+k1+2 \cdot k2)/2 \quad (6)$$

If the condition $k1+2 \cdot k2=1$ holds true, and a value of k1 between 0 and 1 is selected (i.e., $0<k1<1$), the steady state value of the error signal $V_{EA}$ can be written as $V_{EA}=V_{out}/\alpha$, which is the same obtained previously for the step-down buck conversion and the step-up boost conversion, resulting in continuity of operation throughout the three operating modes of converter 5.

Figure 10:
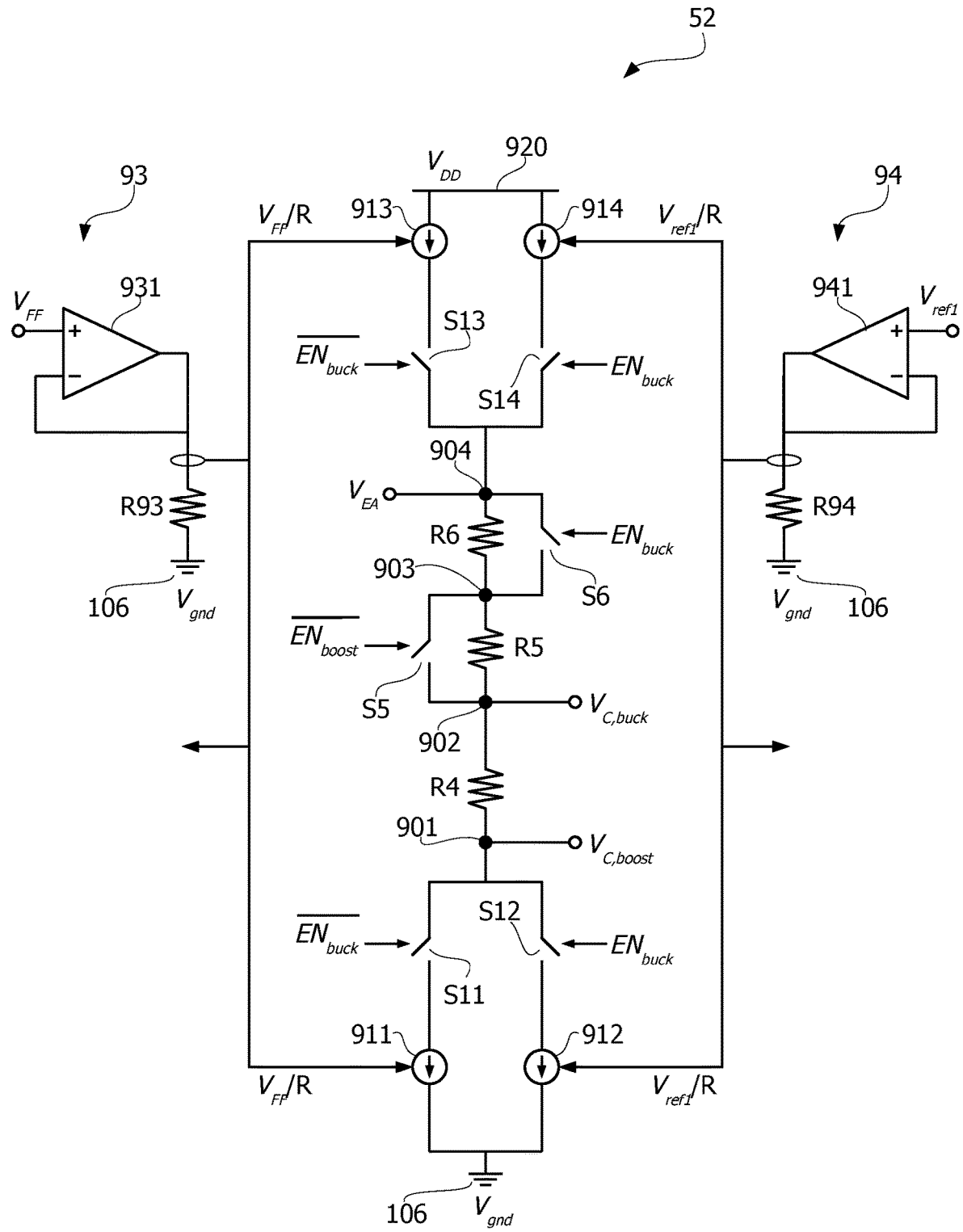
FIG. 10 is a circuit block diagram exemplary of possible implementation details of an analog voltage shifter circuit of a buck-boost converter according to one or more embodiments of the present disclosure.

FIG. 10 is a circuit diagram exemplary of possible implementation details of a voltage shifter circuit 52 according to one or more embodiments, which operates according to the principle disclosed in the foregoing.

As exemplified in FIG. 10, voltage shifter circuit 52 may comprise a voltage divider circuit including a first resistor R4 arranged between node 901 and node 902, a second resistor R5 arranged between node 902 and node 903, and a third resistor R6 arranged between node 903 and node 904. The second resistor R5 may be by-passed via a switch S5 arranged between node 902 and node 903 (i.e., in parallel to resistor R5); switch S5 is controlled by the complement of the boost enable signal $EN_{boost}$, e.g., switch S5 is closed when signal $EN_{boost}$ is de-asserted and is open when signal $EN_{boost}$ is asserted. The third resistor R6 may be by-passed via a switch S6 arranged between node 903 and node 904 (i.e., in parallel to resistor R6); switch S6 is controlled by the buck enable signal $EN_{buck}$, e.g., switch S6 is closed when signal $EN_{buck}$ is asserted and is open when signal $EN_{buck}$ is de-asserted. Node 904 is configured to receive the error signal $V_{EA}$ from the error amplifier circuit 50. Node 902 is configured to produce the buck control signal $V_{C,buck}$ and node 901 is configured to produce the boost control signal $V_{C,boost}$.

As exemplified in FIG. 10, a first current generator 911 may be selectively coupled between node 901 and the ground node 106 at voltage $V_{gnd}$ by closing a switch S11 that is controlled by the complement of the buck enable signal $EN_{buck}$, e.g., switch S11 is closed when signal $EN_{buck}$ is de-asserted and is open when signal $EN_{buck}$ is asserted. The first current generator 911 may be configured to sink from node 901 a current proportional to the feed-forward voltage $V_{FF}$, as further disclosed in the following. A second current generator 912 may be selectively coupled between node 901 and the ground node 106 at voltage $V_{gnd}$ by closing a switch S12 that is controlled by the buck enable signal $EN_{buck}$, e.g., switch S12 is closed when signal $EN_{buck}$ is asserted and is open when signal $EN_{buck}$ is de-asserted. In other words, switches S11 and S12 operate complementarily. The second current generator 912 may be configured to sink from node 901 a current proportional to the reference voltage $V_{ref1}$, as further disclosed in the following.

As exemplified in FIG. 10, a third current generator 913 may be selectively coupled between a supply voltage node 920 at voltage $V_{DD}$ and node 904 by closing a switch S13 that is controlled by the complement of the buck enable signal $EN_{buck}$, e.g., switch S13 is closed when signal $EN_{buck}$ is de-asserted and is open when signal $EN_{buck}$ is asserted. The third current generator 913 may be configured to source to node 904 a current proportional to the feed-forward voltage $V_{FF}$, as further disclosed in the following. A fourth current generator 914 may be selectively coupled between the supply voltage node 920 at voltage $V_{DD}$ and node 904 by closing a switch S14 that is controlled by the buck enable signal $EN_{buck}$, e.g., switch S14 is closed when signal $EN_{buck}$ is asserted and is open when signal $EN_{buck}$ is de-asserted. In other words, switches S13 and S14 operate complementarily; switch S13 operates synchronously with switch S11; and switch S14 operates synchronously with switch S12. The fourth current generator 914 may be configured to source to node 904 a current proportional to the reference voltage $V_{ref1}$, as further disclosed in the following.

As exemplified in FIG. 10, voltage shifter circuit 52 may comprise a first voltage-to-current converter circuit 93 configured to produce a signal proportional to the feed-forward voltage $V_{FF}$ to control the first current generator 911 and the third current generator 913. In particular, circuit 93 may comprise an operational amplifier circuit 931 configured to receive voltage $V_{FF}$ at its non-inverting input, and arranged in a voltage buffer configuration (i.e., having its inverting input directly connected to its output) to pass voltage $V_{FF}$ to a first terminal of a resistor R93 having a resistance value equal to R. The second terminal of resistor R93 is coupled to the ground node 106 at voltage $V_{gnd}$. By sensing the current flowing through resistor R93, a signal proportional to $V_{FF}$ (in particular, equal to $V_{FF}/R$) is produced and used to control the current generators 911 and 913.

As exemplified in FIG. 10, voltage shifter circuit 52 may comprise a second voltage-to-current converter circuit 94 configured to produce a signal proportional to the reference voltage $V_{ref1}$ to control the second current generator 912 and the fourth current generator 914. In particular, circuit 94 may comprise an operational amplifier circuit 941 configured to receive voltage $V_{ref1}$ at its non-inverting input, and arranged in a voltage buffer configuration (i.e., having its inverting input directly connected to its output) to pass voltage $V_{ref1}$ to a first terminal of a resistor R94 having a resistance value equal to R. The second terminal of resistor R94 is coupled to the ground node 106 at voltage $V_{gnd}$. By sensing the current flowing through resistor R94, a signal proportional to $V_{ref1}$ (in particular, equal to $V_{ref1}/R$) is produced and used to control the current generators 912 and 914.

In one or more embodiments as exemplified in FIG. 10, resistor R4 may have a resistance value equal to k1·R, resistor R5 may have a resistance value equal to k2·R, and resistor R6 may have a resistance value equal to (1−k1−k2)·R. By resorting to such dimensioning criteria, and considering that the topology of the analog voltage shifter circuit 52 is determined by the operation mode of converter 5 (buck, boost or buck-boost) via switches S5, S6, S11, S12, S13 and S14, operation of converter 5 as previously discussed can be achieved. For instance, when the converter 5 operates in buck mode, resistors R5 and R6 are by-passed via closed switches S5 and S6, node 902 is directly coupled to node 904 and thus $V_{C,buck}=V_{EA}$. When the converter 5 operates in boost mode, both switches S5 and S6 are open, and thus $V_{C,boost}=V_{EA}-(R4+R5+R6)\cdot V_{FF}/R=V_{EA}-(k1\cdot R+k2\cdot R+(1-k1-k2)\cdot R)\cdot V_{FF}/R=V_{EA}-V_{FF}$. When the converter 5 operates in buck-boost mode, switch S5 is open and switch S6 is closed, and thus:

$$V_{C,buck}=V_{EA}-R5\cdot V_{ref1}/R=V_{EA}-k2\cdot R\cdot V_{ref1}/R=V_{EA}-k2\cdot V_{ref1}$$

$$V_{C,boost}=V_{EA}-(R4+R5)\cdot V_{ref1}/R=V_{EA}-(k1+k2)\cdot R\cdot V_{ref1}/R=V_{EA}-(k1+k2)\cdot V_{ref1}$$

Since all the voltage shifts are proportional to resistor ratios, high accuracy can be achieved in an integrated circuit including converter 5 by matching the resistors.

Table I at the end of the description provides examples of the minimum $T_{on}$ and $T_{off}$ times for all operation modes of buck and boost bridges in accordance with some embodiments. As far as buck and boost modes are concerned, the minimum $T_{off}$ and $T_{on}$, respectively, may be guaranteed by the mode detector thresholds. On the other hand, the minimum $T_{off}$ and $T_{on}$ within the buck-boost operating region are guaranteed by selecting the value of the constant k1. Therefore, in order to improve the converter efficiency, the buck-boost operating region (where all the four switches S1, S2, S3 and S4, e.g., power MOS transistors, are switching) should be as little as possible, while the buck and boost regions (where only two of the four switches S1, S2, S3 and S4 are switching) should be extended. By knowing the minimum on/off time managed by the gate drivers (e.g., included in the driver circuit 56), it is possible to avoid by design the dead zone and improving converter efficiency, by selecting the proper values of k1 and mode detector thresholds.

Figure 11:
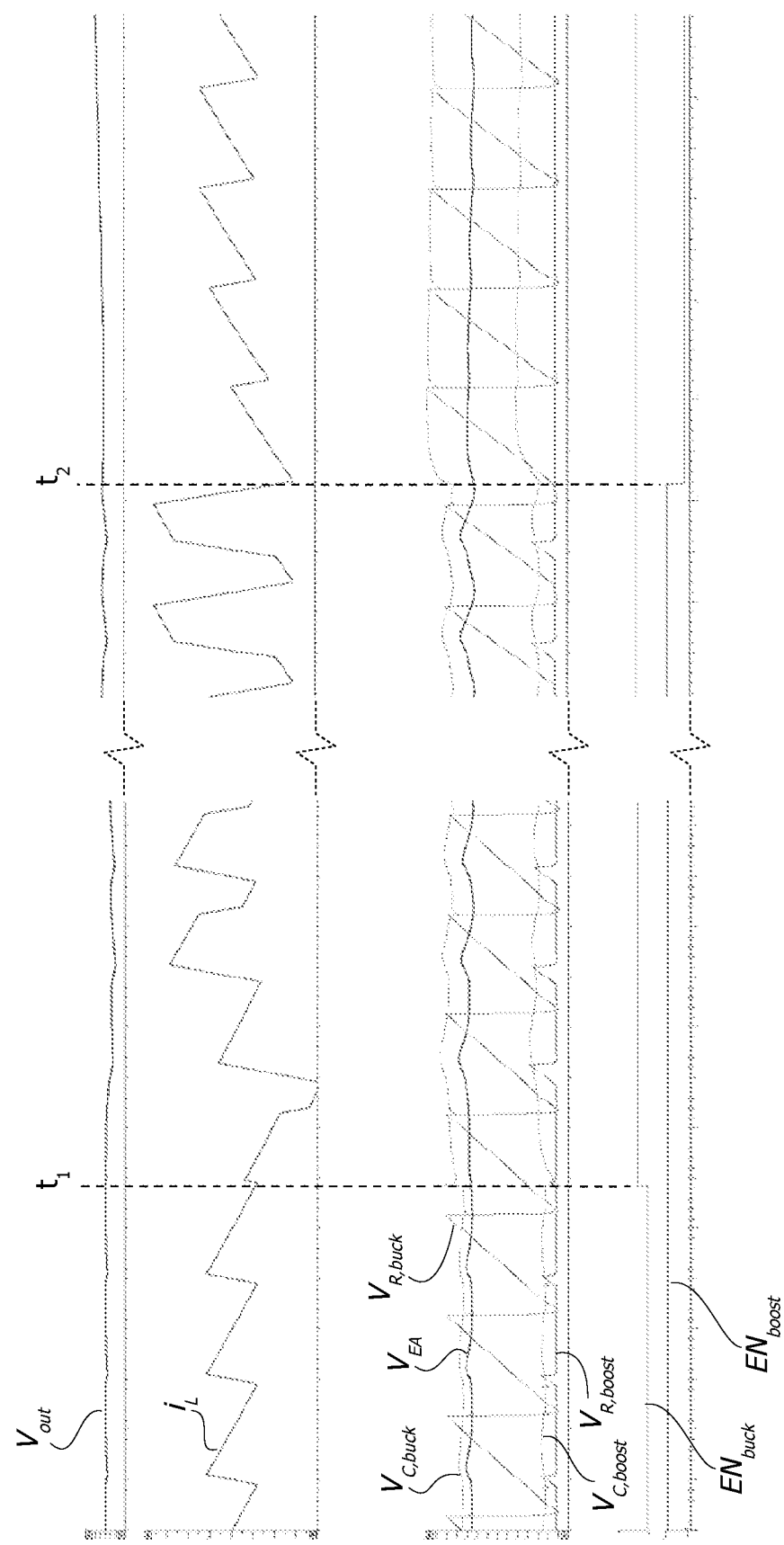
FIG. 11 is a time diagram exemplary of the possible time evolution of signals in a buck-boost converter according to one or more embodiments of the present disclosure.

Operation of one or more embodiments of converter 5 may be further understood by referring to FIG. 11, which illustrates time diagrams exemplary of signals $V_{out}$, $i_L$, $V_{R,buck}$, $V_{R,boost}$, $V_{C,buck}$, $V_{C,boost}$, $V_{EA}$, $EN_{buck}$ and $EN_{boost}$ in the converter 5 when passing from boost mode operation (until instant $t_1$, with $EN_{buck}=0$ and $EN_{boost}=1$), to buck-boost mode operation (from instant $t_1$ to instant $t_2$, with $EN_{buck}=1$ and $EN_{boost}=1$), to buck mode operation (from instant $t_2$, with $EN_{buck}=1$ and $EN_{boost}=0$).

One or more embodiments may thus provide a DC-DC buck-boost converter having improved efficiency that relies on pure buck operation mode and pure boost operation mode only, avoids operation of the converter in the dead-zone and/or reduces coil current ripple in the buck-boost region.

Without prejudice to the underlying principles, the details and embodiments may vary, even significantly, with respect to what has been described by way of example only, without departing from the extent of protection.

TABLE I

| | Boost mode | Buck-boost mode | Buck mode |
|---|---|---|---|
| $T_{on}$ (boost bridge) | $T_{SW} \cdot \left(1 - \dfrac{V_{in}}{V_{out}}\right)$ | $T_{SW} \cdot \left(\dfrac{1-k1}{2}\right)$ | S4 always OFF |

TABLE I-continued

| | Boost mode | Buck-boost mode | Buck mode |
|---|---|---|---|
| $T_{off}$ (buck bridge) | S1 always ON | $T_{SW} \cdot \left[1 - \left(\frac{1+k1}{2}\right) \cdot \frac{V_{out}}{V_{in}}\right]$ | $T_{SW} \cdot \left(1 - \frac{V_{out}}{V_{in}}\right)$ |

What is claimed is:

1. A buck-boost DC-DC converter circuit, comprising:
a switching stage configured to receive a converter input voltage, a buck pulse-width modulated control signal and a boost pulse-width modulated control signal, and to produce a converter output voltage based on the buck pulse-width modulated control signal and the boost pulse-width modulated control signal;
an error amplifier circuit configured to sense the converter output voltage and a reference voltage, and produce an error signal indicative of a difference between the reference voltage and the converter output voltage;
an operation mode selection circuit configured to:
 compare the converter input voltage to a lower threshold and an upper threshold,
 assert a buck mode enable signal in response to the converter input voltage being higher than the lower threshold, and de-assert the buck mode enable signal in response to the converter input voltage being lower than the lower threshold, and
 assert a boost mode enable signal in response to the converter input voltage being lower than the upper threshold, and de-assert the boost mode enable signal in response to the converter input voltage being higher than the upper threshold; and
a voltage shifter circuit configured to produce a buck control signal and a boost control signal based on the error signal, the buck mode enable signal and the boost mode enable signal, wherein the voltage shifter circuit is configured to:
 in response to the buck mode enable signal being asserted and the boost mode enable signal being de-asserted, set $V_{C,buck}=V_{EA}$, where $V_{C,buck}$ is a value of the buck control signal and $V_{EA}$ is a value of the error signal;
 in response to the buck mode enable signal being de-asserted and the boost mode enable signal being asserted, set $V_{C,boost}=(V_{EA}-V_{FF})$, where $V_{C,boost}$ is a value of the boost control signal, and $V_{FF}$ is a value of a feedforward voltage of the buck-boost DC-DC converter circuit; and
 in response to the buck mode enable signal being asserted and the boost mode enable signal being asserted, set $V_{C,buck}=(V_{EA}-k2 \cdot V_{ref1})$ and $V_{C,boost}=(V_{EA}-(k1+k2) \cdot V_{ref1})$, where $V_{ref1}$ is a value of the reference voltage, and k1 and k2 are values that satisfy the conditions $k1+2 \cdot k2=1$ and $0<k1<1$.

2. The buck-boost DC-DC converter circuit of claim 1, wherein the voltage shifter circuit comprises:
a voltage divider circuit including a first node, a second node, a third node, a fourth node, a first resistor coupled between the first node and the second node, a second resistor coupled between the second node and the third node, and a third resistor coupled between the third node and the fourth node, wherein the first node is configured to produce the boost control signal, the second node is configured to produce the buck control signal, and the fourth node is configured to receive the error signal;
a first current generator circuit configured to supply to the voltage divider circuit a current proportional to the feedforward voltage;
a second current generator circuit configured to supply to the voltage divider circuit a current proportional to the reference voltage;
a plurality of switches controllable by the buck mode enable signal and the boost mode enable signal, the plurality of switches being configured to:
 couple the voltage divider circuit to the first current generator circuit to receive the current proportional to the feedforward voltage in response to the buck mode enable signal being de-asserted;
 couple the voltage divider circuit to the second current generator circuit to receive the current proportional to the reference voltage in response to the buck mode enable signal being asserted;
 bypass the second resistor in response to the boost mode enable signal being de-asserted; and
 bypass the third resistor in response to the buck mode enable signal being asserted.

3. The buck-boost DC-DC converter circuit of claim 2, wherein the voltage shifter circuit comprises a first voltage-to-current converter configured to sense the feedforward voltage and control the first current generator circuit, and a second voltage-to-current converter configured to sense the reference voltage and control the second current generator circuit.

4. The buck-boost DC-DC converter circuit of claim 2, wherein a ratio between the current supplied by the first current generator circuit and the feedforward voltage is equal to 1/R, a ratio between the current supplied by the second current generator circuit and the reference voltage ($V_{ref1}$) is equal to 1/R, the first resistor has a resistance value equal to $k1 \cdot R$, the second resistor has a resistance value equal to $k2 \cdot R$, and the third resistor has a resistance value equal to $(1-k1-k2) \cdot R$.

5. The buck-boost DC-DC converter circuit of claim 1, wherein the operation mode selection circuit comprises:
a voltage divider circuit configured to receive the converter input voltage and produce a first signal proportional to the converter input voltage and a second signal proportional to the converter input voltage, wherein a proportionality factor of the first signal to the converter input voltage is higher than a proportionality factor of the second signal to the converter input voltage;
a first comparator configured to assert the buck mode enable signal in response to the first signal being higher than a second reference voltage, and de-assert the buck mode enable signal in response to the first signal being lower than the second reference voltage; and
a second comparator configured to assert the boost mode enable signal in response to the second reference voltage being higher than the second signal, and de-assert the boost mode enable signal in response to the second reference voltage being lower than the second signal.

6. The buck-boost DC-DC converter circuit of claim 5, wherein the second reference voltage is linearly dependent on the reference voltage, or is proportional to the reference voltage, or is the same as the reference voltage.

7. The buck-boost DC-DC converter circuit of claim 1, further comprising:
a ramp generator circuit configured to produce a buck ramp signal based on a buck clock signal and produce a boost ramp signal based on a boost clock signal; and a control circuit configured to:
compare the buck control signal to the buck ramp signal,
in response to the buck mode enable signal being asserted, assert the buck pulse-width modulated control signal in response to a pulse in the buck clock signal and de-assert the buck pulse-width modulated control signal in response to the buck ramp signal being higher than the buck control signal, and
in response to the buck mode enable signal being de-asserted, keep the buck pulse-width modulated control signal asserted;
compare the boost control signal to the boost ramp signal,
in response to the boost mode enable signal being asserted, assert the boost pulse-width modulated control signal in response to a pulse in the boost clock signal and de-assert the boost pulse-width modulated control signal in response to the boost ramp signal being higher than the boost control signal, and
in response to the boost mode enable signal being de-asserted, keep the boost pulse-width modulated control signal de-asserted.

8. The buck-boost DC-DC converter circuit of claim 7, wherein the control circuit comprises:
a first comparator circuit configured to compare the buck control signal to the buck ramp signal, assert a buck comparison signal in response to the buck control signal being higher than the buck ramp signal, and de-assert the buck comparison signal in response to the buck control signal being lower than the buck ramp signal;
a second comparator circuit configured to compare the boost control signal to the boost ramp signal, assert a boost comparison signal in response to the boost control signal being higher than the boost ramp signal, and de-assert the boost comparison signal in response to the boost control signal being lower than the boost ramp signal; and
a logic circuit configured to:
if the buck mode enable signal is asserted, assert the buck pulse-width modulated control signal in response to the buck comparison signal being asserted and de-assert the buck pulse-width modulated control signal in response to the buck comparison signal being de-asserted, and
if the boost mode enable signal is asserted, assert the boost pulse-width modulated control signal in response to the boost comparison signal being asserted and de-assert the boost pulse-width modulated control signal in response to the boost comparison signal being de-asserted.

9. A method, comprising:
receiving, by a switching stage of a buck-boost DC-DC converter circuit, a converter input voltage, a buck pulse-width modulated control signal and a boost pulse-width modulated control signal, and producing a converter output voltage based on the buck pulse-width modulated control signal and the boost pulse-width modulated control signal;
sensing, by an error amplifier circuit of the buck-boost DC-DC converter circuit, the converter output voltage and a reference voltage, and producing an error signal indicative of a difference between the reference voltage and the converter output voltage;

comparing, by an operation mode selection circuit of the buck-boost DC-DC converter circuit, the converter input voltage to a lower threshold and an upper threshold;
asserting, by the operation mode selection circuit, a buck mode enable signal in response to the converter input voltage being higher than the lower threshold, and de-asserting the buck mode enable signal in response to the converter input voltage being lower than the lower threshold;
asserting, by the operation mode selection circuit, a boost mode enable signal in response to the converter input voltage being lower than the upper threshold, and de-asserting the boost mode enable signal in response to the converter input voltage being higher than the upper threshold;
producing, by a voltage shifter circuit of the buck-boost DC-DC converter circuit, a buck control signal and a boost control signal based on the error signal, the buck mode enable signal and the boost mode enable signal;
setting, by the voltage shifter circuit, $V_{C,buck}=V_{EA}$, where $V_{C,buck}$ is a value of the buck control signal and $V_{EA}$ is a value of the error signal, in response to the buck mode enable signal being asserted and the boost mode enable signal being de-asserted;
setting, by the voltage shifter circuit, $V_{C,boost}=(V_{EA}-V_{FF})$, where $V_{C,boost}$ is a value of the boost control signal, and $V_{FF}$ is a value of a feedforward voltage of the buck-boost DC-DC converter circuit, in response to the buck mode enable signal being de-asserted and the boost mode enable signal being asserted; and
setting, by the voltage shifter circuit, $V_{C,buck}=(V_{EA}-k2 \cdot V_{refl})$ and $V_{C,boost}=(V_{EA}-(k1+k2) \cdot V_{refl})$, where $V_{refl}$ is a value of the reference voltage, and k1 and k2 are constant values that satisfy the conditions k1+2·k2=1 and 0<k1<1, in response to the buck mode enable signal being asserted and the boost mode enable signal being asserted.

10. The method of claim 9, comprising:
producing, by a voltage divider circuit of the voltage shifter circuit, the boost control signal at a first node of the voltage divider circuit and producing the buck control signal at a second node of the voltage divider circuit, the voltage divider circuit including the first node, the second node, a third node, a fourth node, a first resistor coupled between the first node and the second node, a second resistor coupled between the second node and the third node, and a third resistor coupled between the third node and the fourth node;
receiving the error signal at the fourth node;
supplying, by a first current generator circuit, to the voltage divider circuit a current proportional to the feedforward voltage;
supplying, by a second current generator circuit, to the voltage divider circuit a current proportional to the reference voltage;
coupling, by a plurality of switches controllable by the buck mode enable signal and the boost mode enable signal, the voltage divider circuit to the first current generator circuit to receive the current proportional to the feedforward voltage in response to the buck mode enable signal being de-asserted;
coupling, by the plurality of switches, the voltage divider circuit to the second current generator circuit to receive the current proportional to the reference voltage in response to the buck mode enable signal being asserted;

bypassing the second resistor in response to the boost mode enable signal being de-asserted; and bypassing the third resistor in response to the buck mode enable signal being asserted.

11. The method of claim 10, comprising:

sensing, by a first voltage-to-current converter of the voltage shifter circuit, the feedforward voltage and controlling the first current generator circuit; and sensing, by a second voltage-to-current converter of the voltage shifter circuit, the reference voltage and controlling the second current generator circuit.

12. The method of claim 10, wherein a ratio between the current supplied by the first current generator circuit and the feedforward voltage is equal to 1/R, a ratio between the current supplied by the second current generator circuit and the reference voltage ($V_{ref}$) is equal to 1/R, the first resistor has a resistance value equal to k1·R, the second resistor has a resistance value equal to k2·R, and the third resistor has a resistance value equal to (1−k1−k2)·R.

13. The method of claim 9, comprising:

receiving, by a voltage divider circuit of the operation mode selection circuit, the converter input voltage and producing a first signal proportional to the converter input voltage and a second signal proportional to the converter input voltage, wherein a proportionality factor of the first signal to the converter input voltage is higher than a proportionality factor of the second signal to the converter input voltage;

asserting, by a first comparator, the buck mode enable signal in response to the first signal being higher than a second reference voltage, and de-asserting the buck mode enable signal in response to the first signal being lower than the second reference voltage; and asserting, by a second comparator, the boost mode enable signal in response to the second reference voltage being higher than the second signal, and de-asserting the boost mode enable signal in response to the second reference voltage being lower than the second signal.

14. The method of claim 9, comprising:

producing, by a ramp generator circuit of the buck-boost DC-DC converter circuit, a buck ramp signal based on a buck clock signal, and producing a boost ramp signal based on a boost clock signal;

comparing, by a control circuit of the buck-boost DC-DC converter circuit, the buck control signal to the buck ramp signal, in response to the buck mode enable signal being asserted, asserting the buck pulse-width modulated control signal in response to a pulse in the buck clock signal and de-asserting the buck pulse-width modulated control signal in response to the buck ramp signal being higher than the buck control signal;

in response to the buck mode enable signal being de-asserted, keeping the buck pulse-width modulated control signal asserted;

comparing the boost control signal to the boost ramp signal;

in response to the boost mode enable signal being asserted, asserting the boost pulse-width modulated control signal in response to a pulse in the boost clock signal and de-asserting the boost pulse-width modulated control signal in response to the boost ramp signal being higher than the boost control signal;

in response to the boost mode enable signal being de-asserted, keeping the boost pulse-width modulated control signal de-asserted.

15. The method of claim 14, comprising:

comparing, by a first comparator circuit of the control circuit, the buck control signal to the buck ramp signal, asserting a buck comparison signal in response to the buck control signal being higher than the buck ramp signal, and de-asserting the buck comparison signal in response to the buck control signal being lower than the buck ramp signal;

comparing, by a second comparator circuit of the control circuit, the boost control signal to the boost ramp signal, asserting a boost comparison signal in response to the boost control signal being higher than the boost ramp signal, and de-asserting the boost comparison signal in response to the boost control signal being lower than the boost ramp signal; and in response to the buck mode enable signal being asserted, asserting, by a logic circuit of the control circuit, the buck pulse-width modulated control signal in response to the buck comparison signal being asserted and de-asserting the buck pulse-width modulated control signal in response to the buck comparison signal being de-asserted, and in response to the boost mode enable signal being asserted, asserting, by the logic circuit, the boost pulse-width modulated control signal in response to the boost comparison signal being asserted and de-asserting the boost pulse-width modulated control signal in response to the boost comparison signal being de-asserted.

16. A device, comprising:

an operation mode selection circuit configured to:

compare an input voltage to a first threshold and a second threshold, assert a buck mode enable signal in response to the input voltage being higher than the first threshold, and de-assert the buck mode enable signal in response to the input voltage being lower than the first threshold, and assert a boost mode enable signal in response to the input voltage being lower than the second threshold, and de-assert the boost mode enable signal in response to the input voltage being higher than the second threshold;

a voltage shifter circuit configured to produce a buck control signal and a boost control signal based on an error signal, the buck mode enable signal and the boost mode enable signal, wherein the voltage shifter circuit is configured to:

in response to the buck mode enable signal being asserted and the boost mode enable signal being de-asserted, set a value of the buck control signal based on a value of the error signal;

in response to the buck mode enable signal being de-asserted and the boost mode enable signal being asserted, set a value of the boost control signal based on the value of the error signal and a value of a feedforward voltage of the device; and in response to the buck mode enable signal being asserted and the boost mode enable signal being asserted, set the value of the buck control signal based on the value of the error signal and a value of the reference voltage, and set the value of the boost control signal based on the value of the error signal and the value of the reference voltage.

17. The device of claim 16, wherein the voltage shifter circuit is configured to:
- in response to the buck mode enable signal being asserted and the boost mode enable signal being de-asserted, set the value of the buck control signal equal to the value of the error signal;
- in response to the buck mode enable signal being de-asserted and the boost mode enable signal being asserted, set the value of the boost control signal equal to a difference between the value of the error signal and the value of a feedforward voltage; and
- in response to the buck mode enable signal being asserted and the boost mode enable signal being asserted, set the value of the buck control signal equal to a difference between the value of the error signal and a product of a first coefficient and the value of the reference voltage, and set the value of the boost control signal equal to a difference between the value of the error signal and a product of the value of the reference voltage and a sum of the first coefficient and a second coefficient, wherein a sum of the second coefficient and two times the first coefficient is equal to 1, and the second coefficient is greater than 0 and less than 1.

18. The device of claim 16, comprising:
- a switching stage configured to receive the input voltage, the buck pulse-width modulated control signal and the boost pulse-width modulated control signal, and produce the output voltage based on the buck pulse-width modulated control signal and the boost pulse-width modulated control signal; and
- an error amplifier circuit configured to sense the output voltage and the reference voltage, and produce the error signal indicative of a difference between the reference voltage and the output voltage.

19. The device of claim 16, comprising:
- a ramp generator circuit configured to produce a buck ramp signal based on a buck clock signal and produce a boost ramp signal based on a boost clock signal;
- a control circuit configured to:
  - compare the buck control signal to the buck ramp signal,
  - in response to the buck mode enable signal being asserted, assert a buck pulse-width modulated control signal in response to a pulse in the buck clock signal and de-assert the buck pulse-width modulated control signal in response to the buck ramp signal being higher than the buck control signal, and
  - in response to the buck mode enable signal being de-asserted, keep the buck pulse-width modulated control signal asserted;
  - compare the boost control signal to the boost ramp signal,
  - in response to the boost mode enable signal being asserted, assert a boost pulse-width modulated control signal in response to a pulse in the boost clock signal and de-assert the boost pulse-width modulated control signal in response to the boost ramp signal being higher than the boost control signal, and
  - in response to the boost mode enable signal being de-asserted, keep the boost pulse-width modulated control signal de-asserted.

20. The device of claim 16, wherein the voltage shifter circuit comprises:
- a voltage divider circuit including a first node, a second node, a third node, a fourth node, a first resistor coupled between the first node and the second node, a second resistor coupled between the second node and the third node, and a third resistor coupled between the third node and the fourth node, wherein the first node is configured to produce the boost control signal, the second node is configured to produce the buck control signal, and the fourth node is configured to receive the error signal;
- a first current generator circuit configured to supply to the voltage divider circuit a current proportional to the feedforward voltage;
- a second current generator circuit configured to supply to the voltage divider circuit a current proportional to the reference voltage;
- a plurality of switches controllable by the buck mode enable signal and the boost mode enable signal, the plurality of switches being configured to:
  - couple the voltage divider circuit to the first current generator circuit to receive the current proportional to the feedforward voltage in response to the buck mode enable signal being de-asserted;
  - couple the voltage divider circuit to the second current generator circuit to receive the current proportional to the reference voltage in response to the buck mode enable signal being asserted;
  - bypass the second resistor in response to the boost mode enable signal being de-asserted; and
  - bypass the third resistor in response to the buck mode enable signal being asserted.

* * * * *